United States Patent [19]
McVittie

[11] 3,813,986
[45] June 4, 1974

[54] SLEEV-LOK ANCHORS

[76] Inventor: Harland E. McVittie, 1199 N.E. Cleveland St., Clearwater, Fla. 33515

[22] Filed: Mar. 3, 1972

[21] Appl. No.: 231,583

[52] U.S. Cl. ................................................ 85/75
[51] Int. Cl. ........................................... F16b 13/06
[58] Field of Search .............. 85/74, 75, 67, 83, 73, 85/77

[56] References Cited
UNITED STATES PATENTS

| 527,406 | 10/1894 | Church | 85/67 |
| 674,715 | 5/1901 | Summerer | 85/75 |
| 1,120,409 | 12/1914 | Rohmer | 85/67 |
| 1,197,606 | 9/1916 | Clements | 85/75 |
| 1,434,394 | 11/1922 | Matthes | 85/75 |
| 2,010,553 | 8/1935 | McIntosh | 85/83 |
| 2,052,793 | 9/1936 | Peirce | 85/74 |
| 2,955,504 | 10/1960 | Lovrinch | 85/75 |
| 3,091,990 | 6/1963 | McVittie | 85/67 |
| 3,196,733 | 7/1965 | Cohen et al. | 85/75 |

Primary Examiner—Edward C. Allen
Attorney, Agent, or Firm—Stein, Orman & Fisher

[57] ABSTRACT

A tubular expansion anchor comprising a resilient nylon sleeve including a centrally disposed annular channel expanding into a conically shaped opening at one end and an internally threaded conically shaped to seat within the conically shaped opening to expand the sleeve within an aperture formed in a supporting surface thereby securing the anchor in place whereby a bracket or like fixture is secured against a supporting surface by means of the anchor and a bolt or screw extending through the fixture and into the anchor. Alternately, the screw or bolt may be reversed and a dome or decorative nut secured to the outer end thereof in either a blind or through hole.

9 Claims, 8 Drawing Figures

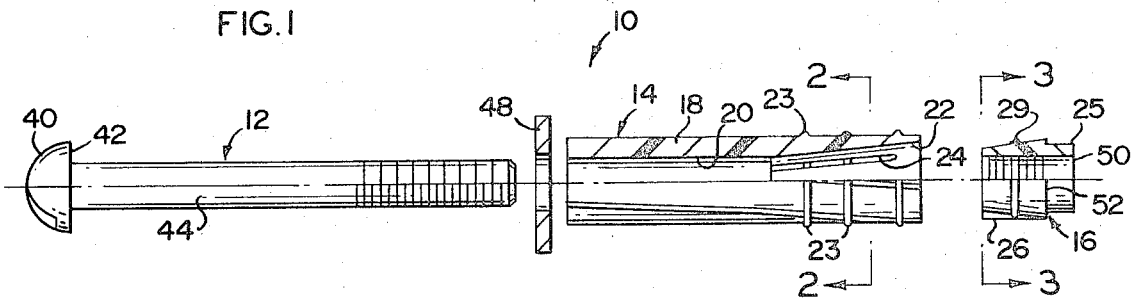
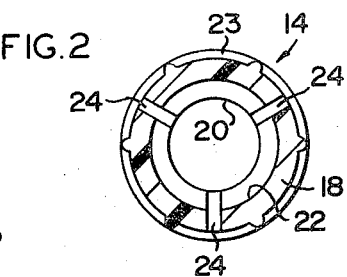
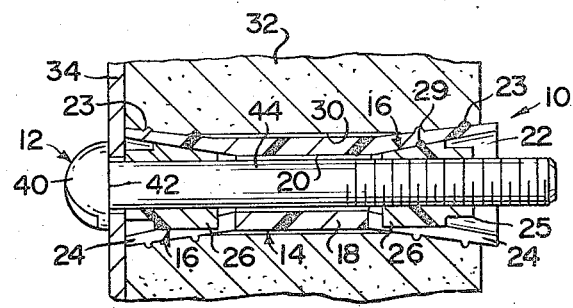
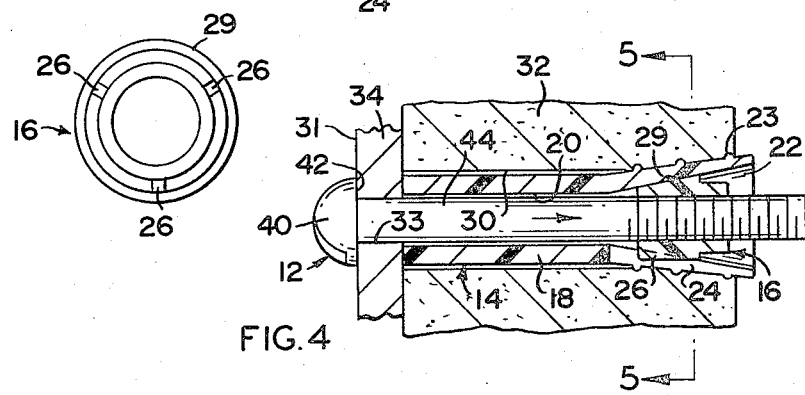
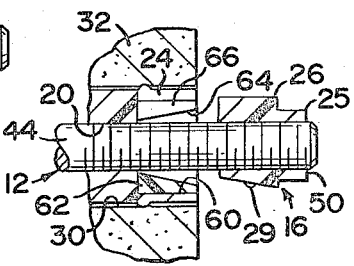
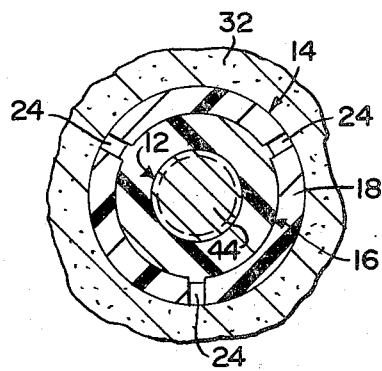
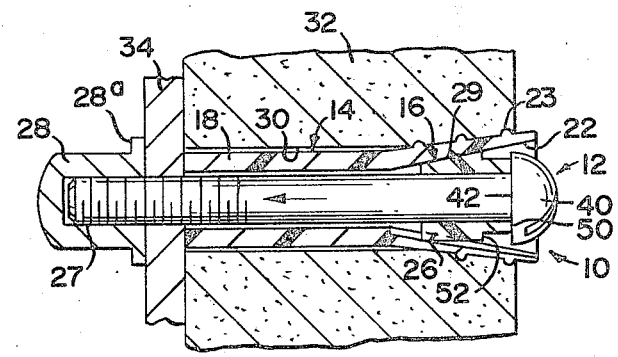

SLEEV-LOK ANCHORS

BACKGROUND OF THE INVENTION

1. Field of the Invention

A tubular expansion anchor configured to expand within an aperture formed in a supporting surface to secure a bracket or like member against the supporting surface.

2. Description of the Prior Art

A number of various fastening means have been designed and developed for securing brackets and other fixtures to plaster walls and similar supporting surfaces. The earliest examples of this type of fastening means were the common nail and screw which were passed through the bracket and into the wall. The bracket is held in place by the friction between the nail/screw and the interior of the wall. Unfortunately, such fasteners exhibited limited load bearing characteristics. Since the holding force was developed directly between the nail/screw and the wall, a bracket or fixture so secured was not easily removed or replaced without repairing the supporting surface.

To overcome these shortcomings, numerous expansion type wall anchors were developed. These expansion anchors generally comprise a tubular internally threaded expansion sleeve frictional disposed within an aperture formed in the supporting surface and a screw or bolt inserted into the sleeve to expand the anchor within the wall to secure it in place. Commonly, these anchors are constructed of metal comprising an elaborate structure. As a result, the cost of materials and tooling are unnecessarily expensive. In addition, most anchors are of a predetermined, unalterable length. Thus, they are not adaptable to varying wall thicknesses and load bearing requirements. An inventory of various sizes and lengths to meet such varied parameters necessarily increases costs as well as increases production costs due to the necessity of varying the production runs during manufacture.

SUMMARY OF THE INVENTION

This invention relates to an expansion type wall anchor. More specifically, the anchor comprises a resilient tubular nylon sleeve having a centrally disposed channel extending therethrough. The annular channel expands at one end into a conically shaped opening. An internally threaded conically shaped insert being of a slightly greater diameter than the enlarged conically shaped opening of the channel is inserted therein. The outer surface of the insert includes a plurality of longitudinally disposed ridges that extend into a corresponding groove or slot formed in the sleeve.

The sleeve and insert are used in combination with a threaded bolt or screw sufficiently long to pass through an aperture formed in the bracket or fixture, to be secured into and through the sleeve and into the insert. One end of the bolt and screw includes an enlarged head with a smooth inner face to engage the outer surface of the bracket to wedge the bracket against the supporting surface.

In use, the bolt or screw is inserted through the sleeve and into the conically shaped insert. The anchor is then inserted into an opening in the wall, insert end first. The screw is then tightened against the outer end of the sleeve drawing the insert inwardly into the sleeve. Since the outside diameter of the insert is greater than the inside diameter of the opening, the sleeve expands radially outward against the interior of the supporting surface securing the anchor within the wall opening. The insert is prevented from rotating relative to the sleeve by the cooperative engagement of the ridges and slots. The screw is withdrawn from the cone and sleeve. Since the sleeve is constructed of nylon, any length extending out of the wall is easily removed leaving the anchor flush with the supporting surface. Of course, the sleeve may be pre-cut to the necessary length before insertion into the wall opening. To mount the bracket, the screw is inserted through the aperture formed in the bracket, into and through the sleeve and threaded into the insert. In this manner, the bracket or fixture is anchored in place.

In an alternate embodiment, the screw is inserted through the cone insert and then into the sleeve. The anchor is then inserted into the opening in the wall, insert and screw head first. The screw extends through the cone and sleeve and forward through the supporting surface. A nut is then tightened against the outer end of the sleeve drawing the insert inwardly into the sleeve. Once the anchor is thus secured within the wall, the nut is removed and the bracket is mounted on the protruding end of the screw. A decorative nut is then secured thereto to hold the bracket against the supporting surface.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the invention, reference should be had to the following detailed description taken in connection with accompanying drawings which:

FIG. 1 is an exploded cross-sectional side view of the anchor.

FIG. 2 is a cross-sectional end view of the sleeve taken along line 2—2 of FIG. 1.

FIG. 3 is a cross-sectional end view of the cone insert taken along line 3—3 of FIG. 1.

FIG. 4 is a cross-sectional side view of the anchor operatively assembled.

FIG. 5 is a cross-sectional end view of the anchor taken along line 5—5 of FIG. 4.

FIG. 6 is a cross-sectional side view of an alternate embodiment of the anchor operatively assembled.

FIG. 7 is a cross-sectional side view of an alternate embodiment to the anchor.

FIG. 8 is a cross-sectional side view of an alternate embodiment to the anchor.

Similar reference characters refer to similar parts throughout the several views of the drawings.

DETAILED DESCRIPTION OF THE PREFERRED EMBODIMENT

As shown in FIG. 1, the anchor assembly can comprise a fastening screw 12, a tubular sleeve 14 and conically shaped insert 16.

The tubular sleeve 14 comprises a resilient tubular body 18 having a centrally disposed annular channel 20 extending therethrough. The annular channel 20 expands at one end into a conically shaped opening 22. A plurality of longitudinally disposed elongated slots 24 are formed about the periphery of the body 18 adjacent to the opening 22. Alternatively, a plurality of grooves 21 (FIG. 6) may be formed on the inner periphery of the body 18 in place of the slots 24. In addition, a plurality of annular ring 23 are formed about the outer periphery of the body 18 immediately adjacent the enlarged opening 22. The conical insert 16 comprises an internally threaded insert 25 having a diameter slightly larger than the enlarged conically shaped opening 22. A plurality of longitudinally disposed ridges 26 corresponding to slots 24 are formed about the outer periphery of insert 25. At lease one annular ring 29 is formed about the periphery to the insert 25.

The sleeve 14 and insert 16 are used in combination with the threaded bolt or screw 12 which is sufficiently long to pass through an aperture 33 of bracket or fixture 34, into and through channel 20 and into the insert 25. One end of screw 12 includes an enlarged head 40 with a smooth inner face 42 to engage the outer surface 31 of the bracket 34 to wedge the bracket 34 against the supporting surface 32 when operatively assembled. The stem 44 of screw 12 has an outside diameter relative to the inside diameter of insert 25 whereby screw 12 and insert 25 are operatively engaged through rotating screw 12 relative to insert 25.

In an alternative embodiment as shown in FIG. 8, the sleeve 14 comprises the body 18 wherein the channel 20 includes a counter-sunk portion 60 which houses a plug 62 including conically shaped opening 64. The plug 62 includes a plurality of apertures 66 corresponding to the apertures 24 formed in body 18 such that the insert 25 may be inserted into the opening 64.

FIG. 6 shows an alternate embodiment including the same screw 12, sleeve 14 and insert 16. In contrast to the above described embodiment, screw 12 is inserted through insert 16 and sleeve 14 outwardly through the supporting surface 32. A decorative dome nut 28 including annular flange 28a operatively engages the protruding end 27 of screw 12 to wedge bracket 34 against supporting surface 32. It should be noted that the outer end 50 of insert 16 comprises a stepped reduced cross-section 52.

In use the screw 12, sleeve 14 and insert 16 are assembled and inserted into a hole 30 drilled or otherwise formed in the supporting surface 32 to the necessary depth. Once in place the anchor assembly 10 is tapped into the hole 30 until the end of the sleeve is flush with the supporting surface 32. Any excess may be easily cut off. The screw 12 is then rotated or tightened, drawing the insert 16 inwardly into the sleeve 14. Since the outside diameter of the insert 16 is greater than the inside diameter of opening 22 the body 18 expands radially outward against the interior of the supporting surface 12 thereby securing the anchor assembly 10 within the wall opening 30. The insert 16 is prevented from rotating relative to the sleeve 14 by the cooperative engagement of the ridges 26 and the slots 24. The annular ridges 26 impinging against the interior surface 32 improves the holding quality of the entire assembly 10. Further, annular ring 29 tends to hold the insert 16 in place relative to the sleeve 14.

To hang a bracket 34, the screw 12 is passed through the aperture 33 formed therein, into and through the sleeve 14 and threaded into the insert 16. As the screw 12 is tightened, the inner face 42 presses against the outer surface 31 of bracket 34 wedging it against the exterior of supporting surface 32. Of course, the body 18 may have an enlarged opening formed at either end wherein a pair of insert 16 may be used to increase the overall of the body expansion and holding qualities of the assembly 10. In addition, a washer 48 may be placed between a screw head 40 and the outer end of sleeve 14 to aid it during the expansion of the sleeve 14.

In the alternative embodiment shown in FIG. 6, screw 12 is inserted through the insert 16 and then into the sleeve 14. The anchor 10 is then inserted into hole 30, insert 16 and screw head 40 first. The screw 12 row extends through the supporting surface 32. A decorative nut 28 is then tightened against the outer end of the sleeve 14 securing the anchor 10 in place as previously described. Once the assembly 10 is secured in place within supporting surface 32, the nut 28 is removed and the bracket 34 is mounted on the protruding end of screw 12. The decorative nut 28 is then secured thereto. As the nut 28 is tightened flange 28a engages bracket 34 holding it in place against the supporting surface 32. The reduced outer end 50 of insert 16 engages inner face 42 of screw 12 without head 40 engaging the periphery of opening 22.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,
What is claimed is:

1. An expansion type anchor comprising a resilient, substantially tubular sleeve having a centrally disposed annular channel extending therethrough, at least one end of said annular channel comprising an enlarged opening, an internally threaded frustrum shaped insert, said insert being at least partially disposed within said opening, the outer larger end of said frustrum shaped insert comprising a stepped, reduced diameter portion having a generally planar end surface, a screw extending through said insert and including an enlarged outer end portion disposed in said annular channel and overlaying and engaging said end surface of said stepped, reduced diameter portion of said insert, at least a portion of outer periphery of said insert extending radially outward to engage the inner side wall of said sleeve, said enlarged outer end of said screw being of reduced diameter relative to said outer periphery of said insert which engages said side wall, whereby said screw is held out of engagement with said sleeve, said screw having a threaded end portion extending out of the opposite end of said sleeve, the diameter of said insert relative to said opening being such that when said screw is tightened said insert is drawn inwardly relative to said sleeve to expand said sleeve radially outward in the region immediately adjacent to said insert.

2. The anchor of claim 1 wherein said insert includes at least one annular ring formed about the periphery thereof.

3. The anchor of claim 1 further including a locking means whereby the rotational movement of said insert is fixed relative to said sleeve.

4. The anchor of claim 3 wherein said locking means comprises a plurality of apertures formed on the periphery of said sleeve adjacent to said opening which cooperatively engages a corresponding plurality of ridge members formed about the outer periphery of said insert, said ridge members extending through said apertures such that the rotational movement of said insert is fixed relative to said sleeve.

5. The anchor of claim 4 wherein said apertures comprise a plurality of longitudinally disposed slots and said rigid members comprise a plurality of longitudinally disposed ridges.

6. The anchor of claim 4 wherein said locking means comprises a plurality of longitudinally disposed grooves formed on the inner periphery of said sleeve that cooperatively engage a corresponding plurality of longitudinally disposed ridges.

7. The anchor of claim 1 wherein said annular channel includes an enlarged conically shaped opening formed in each end thereof, each said opening having one of said inserts disposed therein whereby each end of said sleeve is expanded radially when said screw is tightened.

8. The anchor of claim 1 wherein said sleeve further includes a plurality of annularly disposed ridges formed on the outer surface thereof.

9. The anchor of claim 1 wherein said enlarged opening comprises an enlarged counter-sunk annular recess and wherein said anchor further includes a stepped plug fitted into said annular recess, said plug further including a conically shaped opening, said insert being disposed within said opening of said plug.

* * * * *